US010519072B2

(12) United States Patent
Prada et al.

(10) Patent No.: US 10,519,072 B2
(45) Date of Patent: Dec. 31, 2019

(54) MULTI-NUTRIENT GRANULAR FERTILIZER COMPOSITIONS AND METHODS OF USING THE SAME

(71) Applicant: Produquímica Indústria e Comércio S.A., São Paulo (BR)

(72) Inventors: Ithamar Prada, São Paulo (BR); Paulo Cesar Cau, São Paulo (BR); Michel Castellani, Suzano (BR)

(73) Assignee: Produquímica Indústria e Comércio S.A., São Paulo (BR)

(*) Notice: Subject to any disclaimer, the term of this patent is extended or adjusted under 35 U.S.C. 154(b) by 172 days.

(21) Appl. No.: 15/611,655

(22) Filed: Jun. 1, 2017

(65) Prior Publication Data

US 2018/0237355 A1     Aug. 23, 2018

Related U.S. Application Data

(60) Provisional application No. 62/462,735, filed on Feb. 23, 2017.

(51) Int. Cl.
*C05B 17/02* (2006.01)
*C05G 3/00* (2006.01)
(Continued)

(52) U.S. Cl.
CPC ............. *C05G 3/0058* (2013.01); *C05B 1/02* (2013.01); *C05B 1/04* (2013.01); *C05B 7/00* (2013.01);
(Continued)

(58) Field of Classification Search
CPC ...... C05G 3/0058; C05G 3/0041; C05B 1/02; C05B 19/00; C05B 7/00; C05B 1/04; C05B 17/02; C05C 7/00; C05D 5/00; C05D 1/00
See application file for complete search history.

(56) References Cited

U.S. PATENT DOCUMENTS 3,711,254 A    1/1973 McGowan et al.
5,460,765 A   10/1995 Derdall et al.
(Continued)

FOREIGN PATENT DOCUMENTS

BR    PI0601647        9/2006
CN    1440957 A  *  9/2003   ............... C05G 5/00
(Continued)

OTHER PUBLICATIONS

International Search Report and Written Opinion dated Nov. 23, 2017 in corresponding PCT/US2017/03704, 13 pages.
(Continued)

*Primary Examiner* — Jennifer A Smith
(74) *Attorney, Agent, or Firm* — Hovey Williams LLP

(57) ABSTRACT

Granular fertilizer compositions are described herein that are capable of supplying a wide array of beneficial nutrient and compounds to soil for uptake by the root systems of plants. In preferred embodiments, the compositions provide a source of phosphorus, a source of nitrogen, a source of boron, a source of copper, a source of manganese, a source of zinc, and a source of sulfur in a single application, with highly efficient uptake by plants. The compositions generally comprise a mixture of two or three types of granules, each providing a supply of one or more nutrients. It has been discovered that the components of the three types of granules interact in a synergistic manner, such that problems associated with certain nutrients in soil are overcome, thereby providing a highly efficient multi-nutrient fertilizer.

25 Claims, 10 Drawing Sheets

(51) Int. Cl.
  *C05D 1/00*    (2006.01)
  *C05D 5/00*    (2006.01)
  *C05C 7/00*    (2006.01)
  *C05B 1/02*    (2006.01)
  *C05B 1/04*    (2006.01)
  *C05B 7/00*    (2006.01)
  *C05B 19/00*    (2006.01)

(52) U.S. Cl.
  CPC .............. *C05B 17/02* (2013.01); *C05B 19/00* (2013.01); *C05C 7/00* (2013.01); *C05D 1/00* (2013.01); *C05D 5/00* (2013.01); *C05G 3/0029* (2013.01); *C05G 3/0041* (2013.01)

(56) References Cited

U.S. PATENT DOCUMENTS

| | | | |
|---|---|---|---|
| 5,942,021 | A | 8/1999 | Stirrup |
| 6,132,484 | A | 10/2000 | Phinney |
| 6,254,655 | B1 | 7/2001 | Goertz |
| 6,273,928 | B1 | 8/2001 | Hayati et al. |
| 6,294,633 | B1 * | 9/2001 | Hidaka .................. B01J 29/18 502/232 |
| 6,309,439 | B1 * | 10/2001 | von Locquenghien ...................... C05G 3/0029 71/11 |
| 6,387,145 | B1 | 5/2002 | Miele et al. |
| 6,749,659 | B1 | 6/2004 | Yu et al. |
| 6,890,888 | B2 | 5/2005 | Pursell et al. |
| 7,445,657 | B2 | 11/2008 | Green |
| 8,017,158 | B2 | 9/2011 | Valencia et al. |
| 8,241,387 | B2 | 8/2012 | Shah |
| 8,668,759 | B2 | 3/2014 | Antens et al. |
| 8,679,219 | B2 | 3/2014 | Garcia Martinez et al. |
| 8,801,827 | B2 | 8/2014 | Taylor et al. |
| 8,814,976 | B2 | 8/2014 | Pedersen |
| 8,979,970 | B2 | 3/2015 | Kucera et al. |
| 8,999,031 | B2 | 4/2015 | Varadachari |
| 9,079,805 | B2 | 7/2015 | Muller |
| 9,174,885 | B2 | 11/2015 | Taulbee |
| 9,366,485 | B2 | 6/2016 | Schromm et al. |
| 9,409,827 | B2 | 8/2016 | Taylor et al. |
| 9,540,291 | B2 | 1/2017 | Wheeler et al. |
| 2002/0165097 | A1 * | 11/2002 | Sanders .............. C05G 3/0029 504/361 |
| 2004/0050126 | A1 * | 3/2004 | Green ...................... C05D 9/00 71/31 |
| 2004/0050127 | A1 | 3/2004 | Ambri |
| 2007/0227212 | A1 | 10/2007 | He et al. |
| 2010/0326151 | A1 | 12/2010 | Madigan et al. |
| 2011/0214465 | A1 | 9/2011 | Peacock et al. |
| 2011/0286799 | A1 * | 11/2011 | de la Garza ............. C05D 3/02 405/128.5 |
| 2012/0036906 | A1 * | 2/2012 | Pedersen ................... C05C 3/00 71/23 |
| 2013/0210624 | A1 | 8/2013 | Stringfellow et al. |
| 2014/0216120 | A1 | 8/2014 | Taylor et al. |
| 2016/0075607 | A1 | 3/2016 | Aqel et al. |
| 2016/0102028 | A1 | 4/2016 | Lee et al. |
| 2016/0207844 | A1 | 7/2016 | Stoller |
| 2016/0229761 | A1 | 8/2016 | Cherry et al. |
| 2016/0244378 | A1 | 8/2016 | Tyler et al. |

FOREIGN PATENT DOCUMENTS

| | | | | |
|---|---|---|---|---|
| CN | 103588561 | | 2/2014 | |
| CN | 105884424 | | 8/2016 | |
| CN | 106007899 | A * | 10/2016 | .............. C05G 3/00 |
| EP | 0 571 532 | | 5/1997 | |
| JP | H09188587 | | 7/1997 | |
| JP | 2013-177287 | | 9/2013 | |
| KR | 10-2013-0059716 | | 6/2013 | |
| KR | 10-2015-0071090 | | 6/2015 | |
| RU | 2416593 | | 4/2011 | |
| WO | 92/14690 | | 9/1992 | |
| WO | 2015/010202 | | 1/2015 | |
| WO | 2015/179687 | | 11/2015 | |

OTHER PUBLICATIONS

English abstract only of CN103588561, 1 page.
English abstract only of KR10-2013-0059716, 1 page.
English abstract only of KR10-2015-0071090, 1 page.
Machine translation of BR PI0601647 (Abstract Only Available), 1 page.
Machine translation of JP H09188587, 9 pages.
Rutland, David W., Manual for Determining Physical Properties of Fertilizer, International Fertilizer Development Center, PO Box 2040, Muscle Shoals, Alabama 35662, Sep. 1986, pp. 51-52, pp. 67-68.
International Search Report and Written Opinion dated Jun. 7, 2018 in related PCT/US2018/019526 filed Feb. 23, 2018.
Machine translation of JP2013-177287, 17 pages.
Machine translation of CN105884424 (Abstract Only Available), 1 page.
Cultivar, Produquimica to launch Sulfurgran B-Max at World Fertilizer Congress, Oct. 14, 2014, 2 pages.
Cultivar, Produquimica presents first granulated sulfur, May 2, 2009, 2 pages.

* cited by examiner

US 10,519,072 B2

MULTI-NUTRIENT GRANULAR FERTILIZER COMPOSITIONS AND METHODS OF USING THE SAME

CROSS-REFERENCE TO RELATED APPLICATION

This application claims the benefit of U.S. Provisional Application No. 62/462,735, filed Feb. 23, 2017, entitled GRANULAR FERTILIZERS COMPRISING MACRONUTRIENTS AND MICRONUTRIENTS, AND PROCESSES FOR MANUFACTURE THEREOF, which is incorporated by reference herein.

BACKGROUND OF THE INVENTION

Field of the Invention

The present invention is generally directed to granular fertilizer compositions capable of providing a wide array of micronutrients to soil for highly efficient plant uptake.

Description of the Prior Art

Granular fertilizers are applied to soil to supply beneficial nutrients that can be taken up by the root systems of plants. While a wide variety of fertilizer nutrients are known and used by farmers throughout the world, such fertilizers are typically manufactured so as to provide only a single nutrient or class of nutrient in the formulation. For example, prior art fertilizers may be formulated to supply only sulfur, only micronutrients, or only special NPK (nitrogen-phosphorus-potassium compositions). This is because the various nutrients and classes of nutrients can have negative interactions that decrease the efficacy of the fertilizer. There are also chemical differences in nutrient classes that make it difficult to combine them into a single, effective formulation. While prior art fertilizers may be effective for soils that are deficient for a single nutrient or class of nutrient, these fertilizers are less effective in soils that are deficient for multiple nutrients or nutrient classes. Additionally, conventional products having phosphorus sources face high losses of phosphorus by adsorption in soil. Conventional products for providing micronutrients to soil experience losses of nutrients due to leaching. What is needed is a fertilizer composition capable of supplying multiple nutrients or classes of nutrients to the soil in a single application with high availability for plant uptake.

SUMMARY OF THE INVENTION

In one embodiment, the present invention is directed to a granular fertilizer composition comprising at least first granules or second granules, and third granules. The first granules comprise a source of phosphorus substantially encapsulated by a coating. The second granules comprise a hydrated aluminosilicate having a plurality of pores formed therein and a source of boron, a source of copper, a source of manganese, and a source of zinc. Each of the source of boron, the source of copper, the source of manganese, and the source of zinc are affixed to an inner surface of one or more of the plurality of pores. The third granules comprise a source of sulfur. The composition can be used to fertilize a crop by applying the fertilizer composition to soil.

In another embodiment, the present invention is directed to a granular fertilizer comprising monoammonium phosphate substantially encapsulated by a coating comprising humic acid, fulvic acid, and a polymer.

DETAILED DESCRIPTION OF THE PREFERRED EMBODIMENT

Figure 1:
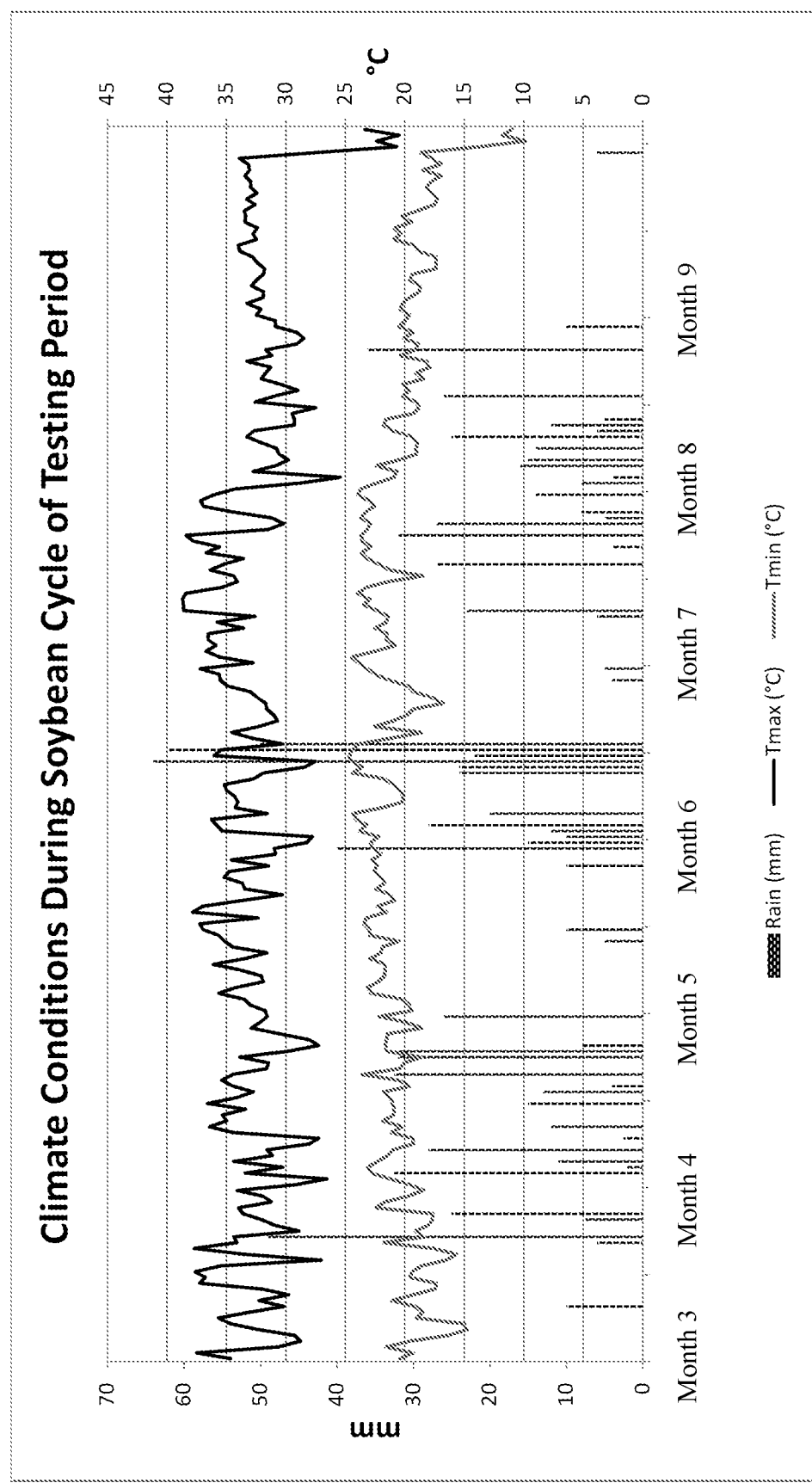
FIG. 1 is a graph showing the climate conditions during the development of the soybean crop during the experimental period.

In one or more embodiments, the present invention is directed to a granular fertilizer composition capable of providing an array of nutrients to soil for high efficiency uptake by plants. In certain embodiments, the composition comprises multiple, distinct types of granules provided, for example, in a homogenous mixture. In preferred embodiments, the composition comprises at least one of first granules or second granules, provided in combination with third granules, and each type of granule comprises one or more nutrients useful for improving plant growth. In particularly preferred embodiments, the fertilizer composition comprises the first granules, second granules, and third granules provided in a single fertilizer composition. It has been discovered that the components of the three types of granules interact in a synergistic manner, such that problems associated with certain nutrients in soil are overcome. Thus, the granules described herein can be combined and provided to soil in a single application to supply a high performance fertilizer composition.

First Granules

The first granules comprise a source of phosphorus. In preferred embodiments, the source of phosphorus comprises a source of phosphorus pentoxide ($P_2O_5$) and/or phosphate ($H_2PO_4^-$). In certain embodiments, the source of phosphorus comprises a compound selected from the group consisting of monoammonium phosphate (MAP), diammonium phosphate, monopotassium phosphate, tripotassium phosphate, single superphosphate, double superphosphate, triple superphosphate, calcined phosphate, urea-phosphate, and mixtures thereof. In particularly preferred embodiments, the source of phosphorus comprises MAP. Exemplary MAP products are commercially-available by Mosaic and Yara. In certain embodiments, the source of phosphorus also provides a source of nitrogen (via the ammonium ion). In certain other embodiments, a separate source of nitrogen can be provided (e.g., ammonia). The first granules will generally comprise from about 80% to about 99% by weight of the source of phosphorus, more preferably from about 90% to about 97% by weight of the source of phosphorus, and most preferably from about 93% to about 95% by weight of the source of phosphorus, with the total weight of the granule taken as 100% by weight.

The source of phosphorus is generally provided as a solid particle, for example having a particle diameter of about 1 mm to about 4 mm, and is substantially encapsulated by a coating. As used herein, "substantially encapsulated" means that the surface area of the particle is at least about 70% covered by the coating. However, preferably the particle is at least about 80% covered by the coating, more preferably at least about 90% covered by the coating, and most preferably at least about 99% covered by the coating. In preferred embodiments, the coating is a polymer-based coating. In certain such embodiments, the polymer component of the coating may comprise a single polymer or combination of more than one polymers. In certain preferred embodiments, the polymer is an anionic polymer. In certain embodiments, the polymer is selected from the group consisting of ammonium polymethacrylate, sodium polymethacrylate, potassium polymethacrylate, acrylic-styrene copolymers, and mixtures thereof.

In certain preferred embodiments, the coating further comprises a humic acid and/or a fulvic acid. Humic acids and fulvic acids are a family of organic acids, natural compounds, and components of the humus (a fraction of soil organic matter). These acids comprise a complex mixture of many different acids containing carboxyl and phenolate groups, and they behave functionally as a dibasic acid or tribasic acid. Humic acids are insoluble in water at acid pH, while fulvic acids are soluble in water across the full range of pH. In use, the humic acid and fulvic acid from the coating solubilize in wet soil and improve the uptake of all available nutrients (including the source of phosphorus and other nutrients described herein) by the root system of plants. The coating may further comprise one or more additional components that improve the application or performance of the fertilizer composition, including but not limited to drying agents and/or anticaking agents. Preferred additive components include titanium dioxide and graphite, although other additives may also be included. In one particularly preferred embodiment, the first granule comprises about 98.4% by weight MAP, about 1.0% by weight of a coating comprising polymer, humic acid, and fulvic acid, and about 0.6% by weight of drying agent.

In certain embodiments, the first granules are prepared by first providing the source of phosphorus in a solid (e.g., powder) form. For example, the source of phosphorus may be provided as a MAP particle, as described above, and the desired particle size may be selected using the appropriately sized sieve. The source of phosphorus is then covered with the polymer(s), humic acid, and/or fulvic acid of the coating. In certain embodiments, the coating is prepared by mixing the polymer(s), humic acid, and/or fulvic acid in solution, and applying the coating solution to the source of phosphorus. For example, the source of phosphorus can be transferred to a ribbon blender or similar equipment for mixing, in which the coating material can be applied by spraying. As noted above, the coating should be applied such that the coating substantially encapsulates the source of phosphorus. In particularly preferred embodiments, the coating is applied such that the polymer present in the coating is caused to contact directly with the surface of the source of phosphorus. The coating is then covered with any additional components. The additives may be applied by hopper into the mixer and are preferably distributed uniformly to all of the coated phosphorus granules.

Second Granules

The second granules comprise a hydrated aluminosilicate having a plurality of pores formed therein, as well as one or more of a source of boron, a source of copper, a source of manganese, and a source of zinc. The hydrated aluminosilicate generally comprises a variety of microporous, aluminosilicate minerals, and its porous structure can accommodate a wide variety of nutrients. In particularly preferred embodiments, the hydrated aluminosilicate is the zeolite clinoptilolite. The nutrient sources listed above are affixed to an inner surface of the hydrated aluminosilicate pores. The hydrated aluminosilicate structure is such that the pores form cavities that can be occupied by ions and water molecules, which can be easily exchanged, allowing for cation exchange and reversible dewatering of the aluminosilicate network. In certain embodiments, the hydrated aluminosilicate pores have an average diameter of about 0.1 nm to about 5 nm, and preferably about 0.2 nm to about 2 nm. However, in certain embodiments, the pores may have an average diameter even smaller (i.e., less than these ranges). Microporous zeolites are particularly preferred carriers for the nutrients described herein, as the relatively small pore size allows for slow release of the nutrients into the soil, thereby providing a longer-lasting supply of the nutrients to the plants. Thus, embodiments of the present invention advantageously reduce losses of nutrients due to leaching, improve the quality of the soil, and improve plant growth, due to the ion exchange capacity and water retention of the aluminosilicate.

The source of boron, source of copper, source of manganese, and source of zinc may be any number of compounds useful to supply forms of these nutrients to soil for plant uptake. In certain embodiments, the source of boron comprises a compound selected from the group consisting of sodium octaborate, boric acid, sodium tetraborate, sodium pentaborate, and mixtures thereof. In certain preferred embodiments, the source of boron comprises sodium octaborate. The source of boron is generally provided in an amount sufficient to provide a boron content in the second granule of about 0.5% to about 10% by weight, preferably about 1% to about 5% by weight, and more preferably about 2% to about 4% by weight, with the total weight of the second granule taken as 100% by weight.

In certain preferred embodiments, the source of copper comprises copper sulfate. The source of copper is generally provided in an amount sufficient to provide a copper content in the second granule of about 0.5% to about 10% by weight, preferably about 1% to about 5% by weight, and more preferably about 2% to about 4% by weight, with the total weight of the second granule taken as 100% by weight.

In certain preferred embodiments, the source of manganese comprises manganese sulfate. The source of manganese is generally provided in an amount sufficient to provide a manganese content in the second granule of about 1% to about 20% by weight, preferably about 5% to about 15% by weight, and more preferably about 8% to about 10% by weight, with the total weight of the second granule taken as 100% by weight.

In certain preferred embodiments, the source of zinc comprises zinc sulfate. The source of zinc is generally provided in an amount sufficient to provide a zinc content in the second granule of about 1% to about 20% by weight, preferably about 5% to about 15% by weight, and more preferably about 8% to about 10% by weight, with the total weight of the second granule taken as 100% by weight.

The second granules may further comprise additives to assist in the manufacturing of the granules or to improve performance. For example, in certain embodiments, the second granules further comprise a binder and/or clay (e.g., low swelling clay) additive.

The second granules may be produced by a variety of methods. However, a particularly preferred method of producing the second granules comprises first mixing the source of boron, the source of copper, the source of manganese, the source of zinc, and the hydrated aluminosilicate. Any desired additives are then added, for example, as a powdered solid or aqueous solution. Water is then added to hydrate the mixture, which previously was composed of monohydrate salts. After incorporation of the additives and the water into the mixture, the material is granulated, whereby water is added through spray nozzles that allow continuous and homogeneous distribution of the water. In this step, the water acts as a granulation vehicle, transforming the hydrated powder of the mixture into granular material. After granulation, the moist granules are dried, for example in a rotary dryer. After drying, the granules are further processed by reduction milling or further granulation to achieve a substantially uniform size.

Third Granules

The third granules comprise a source of sulfur. Unlike sulfate forms of sulfur fertilizers, the source of sulfur used herein is generally provided as a water-insoluble solid. However, once the fertilizer is applied to the soil, the source of sulfur is slowly oxidized to sulfate by soil microbes, providing a long-lasting supply of useable sulfur to the plants. Sources of sulfur provided in this form advantageously have reduced sulfate lixiviation (leaching). In certain embodiments, the third granules further comprise an aluminosilicate. In preferred embodiments, the aluminosilicate is a natural zeolite, such as clinoptilolite or phillipsite, although synthetic zeolites may also be used. In particularly preferred embodiments, the aluminosilicate is a bentonite clay. The aluminosilicate acts as a carrier for the source of sulfur and aids in the slow release of the source of sulfur, thereby providing a long-lasting supply of sulfur to the soil.

Additionally, it has been discovered that when provided in soil the micronutrients from the second granule are adsorbed in the aluminosilicate, thereby reducing or avoiding the precipitation of zinc and phosphorus.

In one or more embodiments, the first and/or second granules are provided in a homogenous mixture with the third granules. In certain embodiments, the fertilizer composition consists essentially of the first, second, and third granules. However, in certain other embodiments, additional components or granule fertilizers may also be included. The first, second, and third granules preferably have a substantially uniform average diameter. As used herein, "substantially uniform average diameter" means that the average diameters of each of the first, second, and third granules are within about 2 mm of each other. This allows for a more even application of the fertilizer compositions to the soil. In certain embodiments, the average diameter of the granules is about 1 mm to about 5 mm, and more preferably about 2 mm to about 4 mm. The fertilizer composition generally comprises from about 50% to about 95% by weight, preferably about 75% to about 85% by weight of the first granules, with the total weight of the fertilizer composition taken as 100% by weight. The fertilizer composition generally comprises from about 3% to about 25% by weight, preferably about 12% to about 20% by weight of the second granules, with the total weight of the fertilizer composition taken as 100% by weight. The fertilizer composition generally comprises from about 5% to about 30% by weight, preferably about 5% to about 8% by weight of the third granules, with the total weight of the fertilizer composition taken as 100% by weight. In one particularly preferred embodiment, the fertilizer composition comprises about 75.4% by weight of the first granules, about 5.0% by weight of the second granules, and about 19.5% by weight of the third granules. In another particularly preferred embodiment, the fertilizer composition comprises about 81.7% by weight of the first granules, about 5.0% by weight of the second granules, and about 13.3% by weight of the third granules.

The granular fertilizer composition described herein may be applied to soil in order to provide a supply of nutrients to the soil for uptake by plants. The fertilizer composition may be applied to the soil using any number of known fertilizing techniques. Regardless the application method, the fertilizer composition is generally applied to the soil at a rate of about 50 kg·ha$^{-1}$ to about 500 kg·ha$^{-1}$, preferably about 100 kg·ha$^{-1}$ to about 400 kg·ha$^{-1}$, and more preferably about 150 kg·ha$^{-1}$ to about 350 kg·ha$^{-1}$. Advantageously, the fertilizer compositions of the present invention can be applied so as to provide a wide array of beneficial nutrients and compounds fertilizer in a single application, thereby avoiding the time and costs to apply multiple products in multiple applications.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth efficacy trials using the fertilizer compositions according to embodiments of the present invention. It is to be understood, however, that these examples are provided by way of illustration and nothing therein should be taken as a limitation upon the overall scope of the invention.

Example I

Figure 2:
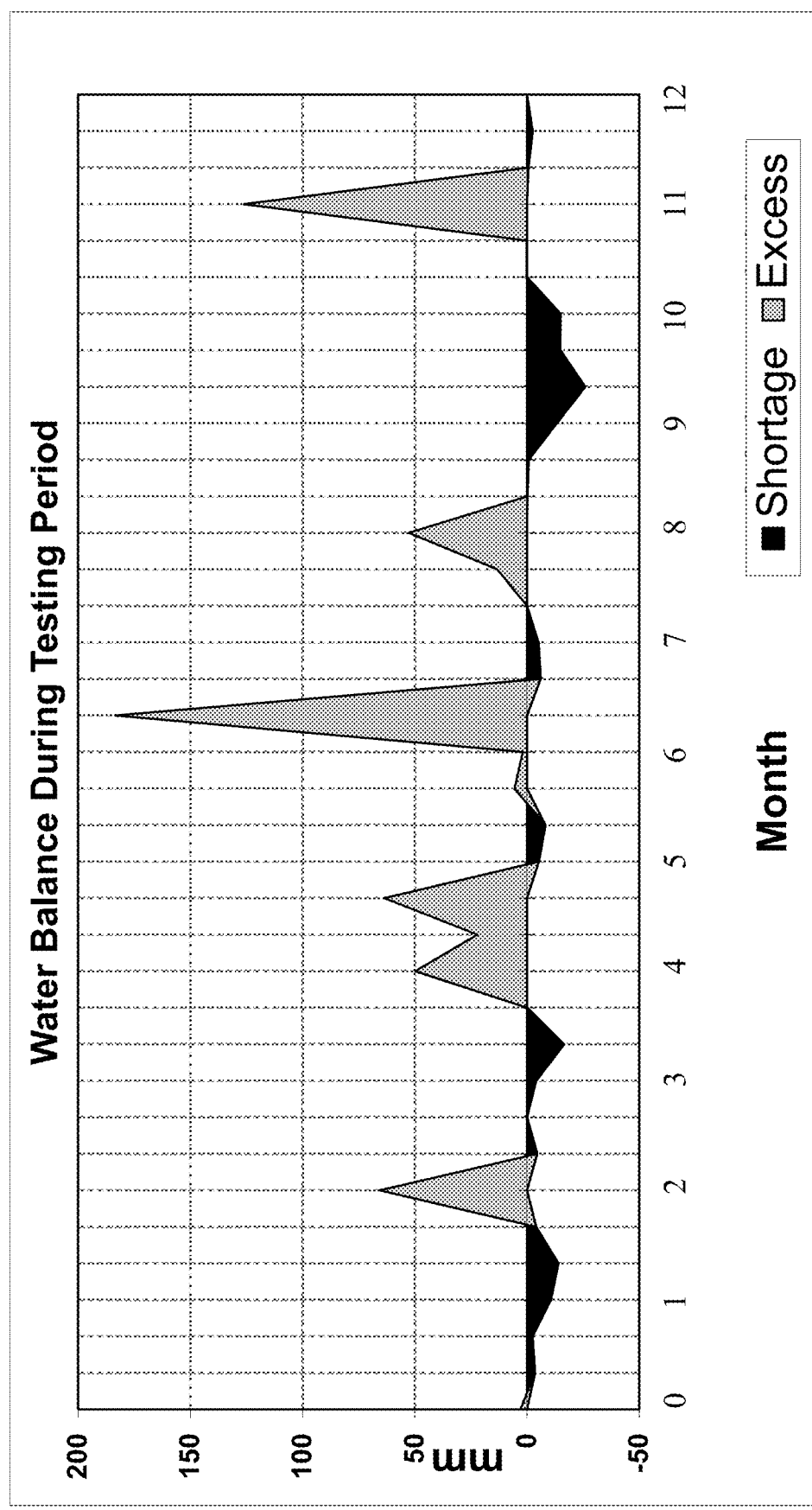
FIG. 2 is a graph showing the sequential water balance during the development of the soybean crop during the experimental period.

This example evaluated the performance of different sources of phosphorus on soybean crop production.
Methodology The experiment was conducted in Block 11, at the Geraldo Schultz Research Center, located in the municipality of Iracemápolis—SP, with an average elevation of 570 m (longitude 47° 30' 10.81" W and latitude 22° 38' 49.14" S). The climate according to Köppen is of type Cwa (tropical climate of altitude, with rains in the summer and dryness in the winter). FIGS. 1 and 2 show, respectively, the climatic conditions and the water balance, during the development of soybean crop within the CPGS. The soil was classified as typical dystrophic Red Latosol. Table 1 below presents the analytical results prior to the installation of the experiment.

Table 2 below presents the characteristics of the soybean crop implantation in the CPGS.

TABLE 2

Characteristics of the cultivar used and implantation of the soybean crop.

| ITEM | DESCRIPTION |
|---|---|
| CROP | SOY BEANS |
| CULTIVAR | NS 6700 IPRO sieve 6 |
| FINAL POPULATION | 340,000 plants/ha |
| SPACING | 0.50 m |
| PLANTING | Day 0 |
| EMERGENCE | Day 7 |
| HARVEST | Day 135 |
| MEAN CYCLE | 135 days |
| GENERAL MANAGEMENT | 100 mL 100 kg−1 Standak Top |
| | 200 ml Cruiser |
| | 100 ml Maxin XL |
| | 100 g ha−1 NiCoMo Dry |
| | 120 mL ha−1 Improver |
| | Basic fertilization - 200 kg/ha Potenza P 10-49-00 |

Formulation A was prepared from a MAP particle covered with a coating comprising polymer, humic acid, and fulvic acid, as described above, and comprises 10% nitrogen and 49% $P_2O_5$. The treatments applied include Formulation A, as well as commercially-available products (Potenza 10-49-00 and MAP 11-52) and a control.

TABLE 3

Description of treatments.

| Treatment | Description | Dose $P_2O_5$ (kg/ha) |
|---|---|---|
| 1 | Control | — |
| 2 | Potenza 10-49-00 | 120 |
| 3 | | 100 |
| 4 | | 80 |
| 5 | | 60 |
| 6 | Formulation A 49% $P_2O_5$ | 120 |
| 7 | | 100 |
| 8 | | 80 |
| 9 | | 60 |
| 10 | MAP 11-52 | 120 |
| 11 | | 100 |
| 12 | | 80 |
| 13 | | 60 |

The treatments were applied 1 day before planting. Each plot was composed of 6 lines with 14 m in length, with 6 replicates per treatment. The useful plot consisted of 2 lines with 5 m in length. In all the plots, the SUPERA program

TABLE 1

Physical and chemical analyses of the soil of Block 11, before corrections and installations of soybean experiments.

| Depth (cm) | pH $CaCl_2$ | M.O. g $dm^{-3}$ | P mg | S | Ca | Mg | K | Al | H + Al | Total $mmol_c$ $dm^{-3}$ | CTC | V % | V % | Sat Al m % |
|---|---|---|---|---|---|---|---|---|---|---|---|---|---|---|
| 0-10 | 4.6 | 18 | 5 | 6 | 13 | 6 | 2.5 | 4 | | 34 | 21.5 | 55.5 | 39 | 16 |
| 10-20 | 4.6 | 12 | 4 | 9 | 14 | 6 | 1.4 | 4 | | 29 | 21.4 | 50.4 | 42 | 16 |
| 20-40 | 4.4 | 9 | 4 | 24 | 8 | 5 | 0.7 | 11 | | 46 | 13.7 | 59.7 | 23 | 44 |

| Depth (cm) | B | Cu | Fe mg $dm^{-3}$ | Mn | Zn | Clay | Silt | Sand |
|---|---|---|---|---|---|---|---|---|
| 0-10 | 0.23 | 2.0 | 62 | 5.4 | 13.0 | 22 | 26 | 52 |
| 10-20 | 0.23 | 1.5 | 40 | 6.2 | 12.7 | 25 | 27 | 48 |
| 20-40 | 0.21 | 0.9 | 31 | 5.0 | 11.3 | 32 | 26 | 42 |

(complete nutritional program for soybean cultivation) was applied, complete nutritional program for soybean cultivation: TS, V4, V8, R1 and R5.1. The data were submitted to analysis of the variance and when the differences between the means were significant (F test), these were compared by the Scott-Knott test at the 10% probability level.

The variables analyzed were productivity and weight of 100 grains. The plants were harvested, adjusting the grain moisture in 14%, to determine the productivity in bags 60 kg·ha$^{-1}$ and mass of 1,000 grains in grams.

Results

TABLE 4

Stand (plants/m) of the treatments applied in the soybean crop, with application of foliar fertilizer.

| Treatment | Dose | | | | | | | | | |
|---|---|---|---|---|---|---|---|---|---|---|
| | 60 | | 80 | | 100 | | 120 | | Average | |
| Control | 16.87 | Ab | 16.87 | Aa | 16.87 | Aa | 16.87 | Aa | 16.87 | a |
| Potenza | 17.07 | Aa | 18.02 | Aa | 16.37 | Aa | 17.2 | Aa | 17.15 | a |
| Form. A | 15.00 | Ab | 16.82 | Ba | 16.2 | Aa | 17.02 | Ba | 16.26 | a |
| MAP | 17.12 | Aa | 16.87 | Aa | 16.7 | Aa | 17.02 | Aa | 16.93 | a |
| Average | 16.63 | A | 17.15 | A | 16.53 | A | 17.03 | A | | |
| CV (%) | | | | | 7.52 | | | | | |

Averages followed by the same letter, lowercase in the column and upper case in the row, do not differ from each other by the Scott-Knott test at the 10% probability level.

TABLE 5

Weight of 100 seeds (g) of the treatments applied in the soybean crop, with application of foliar fertilizer.

| Treatment | Dose | | | | | | | | | |
|---|---|---|---|---|---|---|---|---|---|---|
| | 60 | | 80 | | 100 | | 120 | | Average | |
| Control | 15.43 | Ab | 15.43 | Aa | 15.43 | Aa | 15.43 | Aa | 15.43 | b |
| Potenza | 15.04 | Ab | 14.41 | Bb | 14.05 | Bb | 14.8 | Ab | 14.67 | c |
| Form. A | 15.56 | Ab | 15.76 | Aa | 15.56 | Aa | 15.81 | Aa | 15.63 | a |
| MAP | 16.11 | Aa | 15.45 | Aa | 15.75 | Aa | 15.76 | Aa | 15.7 | a |
| Average | 15.44 | A | 15.26 | A | 15.2 | A | 15.45 | A | | |
| CV (%) | | | | | 3.7 | | | | | |

Averages followed by the same letter, lowercase in the column and upper case in the row, do not differ from each other by the Scott-Knott test at the 10% probability level.

TABLE 6

Productivity (bags · ha$^{-1}$) of the treatments applied in the soybean crop, with application of foliar fertilizer.

| Treatment | Dose | | | | | | | | | |
|---|---|---|---|---|---|---|---|---|---|---|
| | 60 | | 80 | | 100 | | 120 | | Average | |
| Control | 49.7 | Ac | 49.7 | Ab | 49.7 | Ac | 49.7 | Ac | 49.7 | c |
| Potenza | 44.25 | Bb | 52.12 | Ab | 43.99 | Bc | 46.33 | Bc | 46.19 | d |
| Form. A | 59.16 | Ba | 64.22 | Aa | 64.84 | Ab | 56.77 | Ba | 61.25 | a |
| MAP | 39.81 | Bc | 40.82 | Bc | 71.35 | Aa | 66.66 | Aa | 54.67 | b |
| Average | 47.44 | C | 51.72 | B | 57.48 | A | 54.88 | A | | |
| CV (%) | | | | | 11.5 | | | | | |

Averages followed by the same letter, lowercase in the column and upper case in the row, do not differ from each other by the Scott-Knott test at the 10% probability level.

Conclusion

Under the conditions of the present study, it can be concluded that there was a significant response to phosphorus application. Additionally, the use of Formulation A showed statistically significant increase in productivity compared to the other treatments applied.

Example II

This example further evaluated the performance of different sources of phosphorus on soybean crop production.

Methodology

The experiment was conducted at the same location and under the same soil and climate as Example I. Thus, FIGS. 1 and 2 also show the specific climate conditions and water balance over the testing period. Details regarding this experiment are shown in Table 7.

TABLE 7

Characteristics of the cultivar used and implantation of the soybean crop.

| ITEM | DESCRIPTION |
|---|---|
| CROP | SOY BEANS |
| CULTIVAR | NS 6700 IPRO sieve 6 |
| FINAL POPULATION | 340,000 plants/ha |
| SPACING | 0.50 m |
| PLANTING | Day 0 |
| EMERGENCE | Day 7 |
| HARVEST | Day 135 |
| MEAN CYCLE | 135 days |
| GENERAL MANAGEMENT | 100 mL 100 kg-1 Standak Top |
| | 200 ml Cruiser |
| | 100 ml Maxin XL |
| | 100 g ha-1 NiCoMo Dry |
| | 120 mL ha-1 Improver |
| | Basic fertilization - 200 kg/ha |
| | Potenza P 10-49-00 |

The same treatments were used as in Example I, and the same variables were analyzed.

Results

TABLE 8

Weight of 100 seeds (g) of the treatments applied in the soybean crop, with application of foliar fertilizer.

| Treatment | Dose | | | | | | | | | |
|---|---|---|---|---|---|---|---|---|---|---|
| | 60 | | 80 | | 100 | | 120 | | Average | |
| Control | 17.76 | Aa | 17.76 | Aa | 17.76 | Aa | 17.76 | Aa | 17.76 | a |
| Potenza | 17.64 | Aa | 17.10 | Aa | 17.46 | Aa | 18.18 | Aa | 17.59 | a |
| Form. A | 17.64 | Aa | 17.46 | Aa | 18.00 | Aa | 17.99 | Aa | 17.77 | a |
| MAP | 17.31 | Aa | 18.23 | Aa | 17.87 | Aa | 17.46 | Aa | 17.73 | a |
| Average | 17.59 | A | 17.64 | A | 17.78 | A | 17.85 | A | | |
| CV (%) | | | | | 4.04 | | | | | |

Averages followed by the same letter, lowercase in the column and upper case in the row, do not differ from each other by the Scott-Knott test at the 10% probability level.

TABLE 9

Productivity (bags · ha$^{-1}$) of the treatments applied in the soybean crop, with application of foliar fertilizer.

| Treatment | Dose | | | | | | | | | |
|---|---|---|---|---|---|---|---|---|---|---|
| | 60 | | 80 | | 100 | | 120 | | Average | |
| Control | 31.27 | Ac | 31.27 | Ab | 31.27 | Ad | 31.27 | Ac | 31.27 | c |
| Potenza | 56.91 | Aa | 50.51 | Aa | 52.86 | Ab | 50.70 | Bc | 52.74 | d |
| Form. A | 50.64 | Ba | 52.32 | Ba | 60.31 | Aa | 52.44 | Ba | 53.92 | a |

TABLE 9-continued

Productivity (bags · ha$^{-1}$) of the treatments applied in the soybean crop, with application of foliar fertilizer.

| Treatment | Dose | | | | |
|---|---|---|---|---|---|
| | 60 | 80 | 100 | 120 | Average |
| MAP | 43.45 Ab | 48.43 Aa | 41.02 Ac | 43.62 Aa | 44.13 b |
| Average | 45.57 A | 45.63 A | 46.37 A | 44.51 A | |
| CV (%) | | | 11.84 | | |

Averages followed by the same letter, lowercase in the column and upper case in the row, do not differ from each other by the Scott-Knott test at the 10% probability level.

The planting of this experiment was carried out in the opening area, that is, a high potential for micronutrient response. In spite of this, the planting occurred outside the ideal window for the cultivar to the region and the plants suffered with severe water deficit, according to FIG. 1, presenting therefore low productivities. To analyze nutrient content, soil samples were taken during the testing period. Despite the low yields obtained, it was possible to observe the effect of treatments on the availability of micronutrients (B, Cu, Mn and Zn) in the soil, which is certainly one of the factors that contributed to increased productivity.

Conclusions

Under the conditions of the present study, it can be concluded that there was a significant response to phosphorus application, the use of Formulation A added in the productivity parameter, and was particularly effective at a dose of 80 kg ha-1.

Example III

This example evaluated the effect of the use of different sources of micronutrients, with different solubility, in the development and productivity of the soybean crop.

Methodology

The experiment was conducted in Block 3-2, at the Geraldo Schultz Research Center, located in the municipality of Iracemápolis—SP, with an average elevation of 570 m (longitude 47° 30' 10.81" W and latitude 22° 38" 49.14" S). The climate according to Köppen is of type Cwa (tropical climate of altitude, with rains in the summer and dryness in the winter). The soil was classified as typical dystrophic Red Latosol. Table 10 below presents the analytical results prior to the installation of the experiment.

Figure 3:
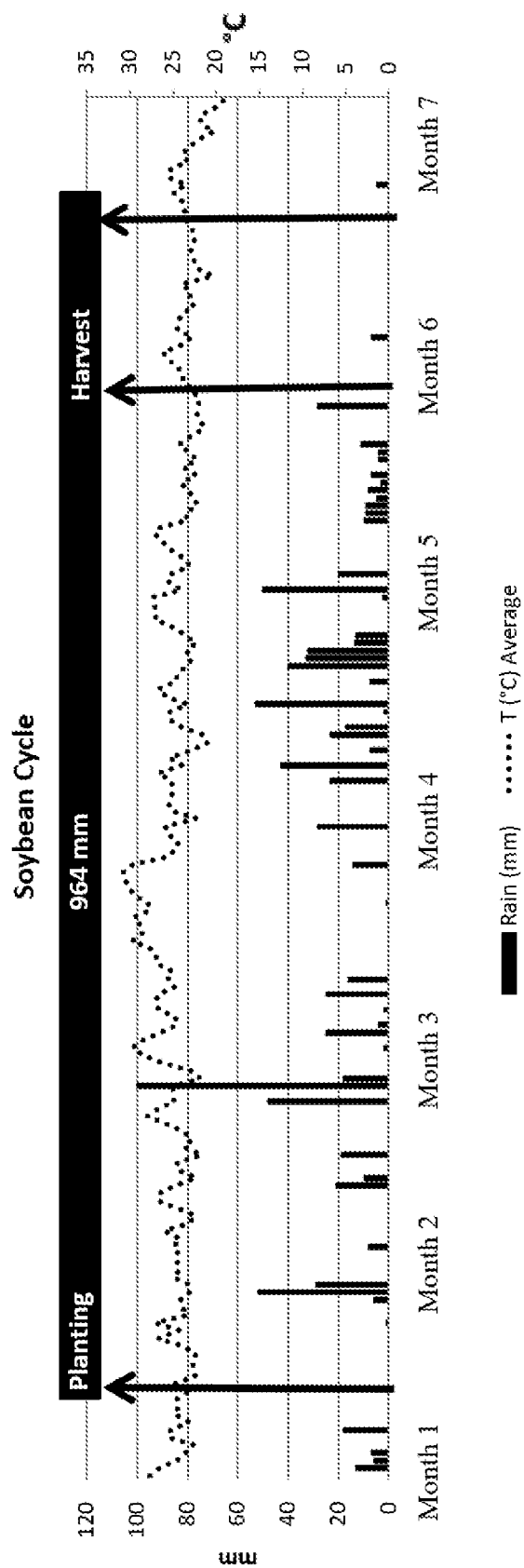
FIG. 3 is a graph showing the climate conditions during the development of the soybean crop during the experimental period.
Figure 4:
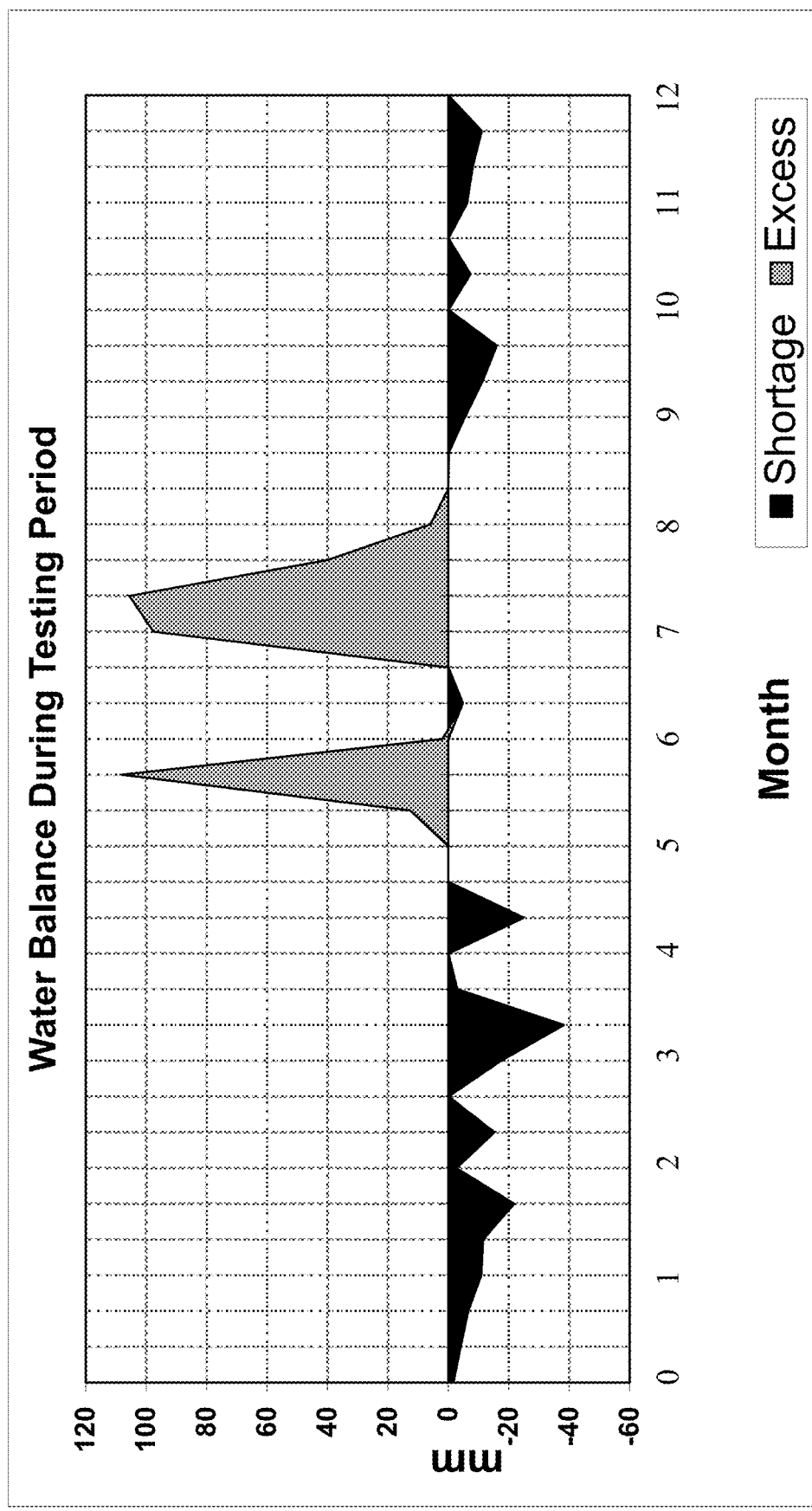
FIG. 4 is a graph showing the sequential water balance during the development of the soybean crop during the experimental period.

FIGS. 3 and 4 show the climatic conditions and water balance during the development of soybean crop, and Table 11 below shows the amount of rainfall during the testing period.

TABLE 11

Rainfall during testing period.

| | Month 1 | Month 2 | Month 3 | Month 4 | Month 5 | Month 6 |
|---|---|---|---|---|---|---|
| Rain (mm) | 132 | 255 | 109 | 357 | 105 | 6 |

Table 12 below shows the characteristics of the culture implantation of the soy crop.

TABLE 12

Characteristics of the cultivar used and implantation of the soybean crop.

| ITEM | DESCRIPTION |
|---|---|
| CROP | SOY BEANS |
| CULTIVAR | MONSOY 6410 IPRO |
| FINAL POPULATION | 240,000 plants/ha |
| SPACING | 0.50 m |
| PLANTING | Day 0 |
| EMERGENCE | Day 5 |
| HARVEST | Day 133 to Day 154 |
| MEAN CYCLE | 133 to 154 days |
| GENERAL | TS: 0.1 L/ha Standak Top |
| MANAGEMENT | Basic fertilization - 200 kg/ha Potenza P |
| | Preplanting fertilization - 200 kg/ha KCl |
| | 2 applications of herbicides |
| | 5 applications of fungicides and insecticides |

Formulation B was prepared from a clinoptilolite zeolite, sodium octaborate, copper sulfate, manganese sulfate, and zinc sulfate, as described above, and comprises 9% Zn, 9% Mn, 3% B, and 3% Cu. The treatments applied include Formulation B, as well as commercially-available products (MIB Sulfate and MIB Oxisulfate) and a control.

TABLE 13

Description of treatments.

| Treatment | Description | Dose (kg ha$^{-1}$) |
|---|---|---|
| 1 | Control | |
| 2 | MIB Sulfate | 31.25 |

TABLE 10

Physical and chemical analyzes of the soil of Block 3-2, before the corrections and facilities of the soybean experiments.

| Depth (cm) | pH CaCl$_2$ | M.O. g dm$^{-3}$ | P mg | S | Ca | Mg | K mmol$_c$ dm$^{-3}$ | Al | H + Al | Total | CTC | V % V % | Sat Al m % |
|---|---|---|---|---|---|---|---|---|---|---|---|---|---|
| 0-10 | 5.0 | 25 | 1 | 39 | 40 | 16 | 4.2 | 1 | 37 | 60.2 | 97.2 | 62 | 2 |
| 10-20 | 4.7 | 24 | 1 | 48 | 34 | 15 | 2.2 | 4 | 52 | 51.2 | 103.2 | 50 | 7 |
| 20-40 | 4.0 | 19 | 8 | 51 | 11 | 5 | 1.4 | 17 | 102 | 17.4 | 119.4 | 15 | 49 |

| Depth (cm) | B | Cu | Fe mg dm$^{-3}$ | Mn | Zn | Clay | Silt | Sand |
|---|---|---|---|---|---|---|---|---|
| 0-10 | 0.33 | 3.3 | 52 | 5.0 | 2.7 | 47 | 18 | 35 |
| 10-20 | 0.30 | 2.5 | 54 | 3.8 | 1.6 | 52 | 14 | 34 |
| 20-40 | 0.24 | 1.0 | 43 | 3.2 | 0.2 | 52 | 15 | 33 |

TABLE 13-continued

Description of treatments.

| Treatment | Description | Dose (kg ha$^{-1}$) |
|---|---|---|
| 3 | | 62.5 |
| 4 | | 93.75 |
| 5 | MIB Oxisulfate | 20 |
| 6 | | 40 |
| 7 | | 60 |
| 8 | Formulation B | 21 |
| 9 | | 42 |
| 10 | | 63 |

The treatments were applied in haul, 1 day before planting. Each plot was composed of 6 lines with 6 m in length, with 6 replicates per treatment. The useful plot consisted of 2 lines with 5 m in length. The data were submitted to analysis of the variance and when the differences between the means were significant (F test), these were compared by the Scott-Knott test at the 10% probability level.

The variables analyzed were productivity and weight of 100 grains. The plants were harvested, adjusting the grain moisture in 14%, to determine the productivity in bags (60 kg)·ha$^{-1}$ and mass of 100 grains in grams.

Results

TABLE 14

Weight 100 grains (g) of the soybean plants submitted to pre-planting fertilization.

| | Dose (kg ha$^{-1}$) | | | | |
|---|---|---|---|---|---|
| Treatment | 0 | 1 | 2 | 3 | Average (g) |
| MIB Sulfate | — | 16.74 | 17.18 | 17.80 | 17.3 |
| MIB Oxisulfate | 17.59 | 18.00 | 17.09 | 17.60 | 17.6 |
| Formulation B | — | 18.38 | 16.50 | 17.58 | 17.5 |
| Average | 17.59 | 17.71 | 16.92 | 17.66 | |

TABLE 15

Productivity (bags/ha) of the soybean plants submitted to pre-planting fertilization.

| | Dose (kg ha$^{-1}$) | | | | |
|---|---|---|---|---|---|
| Treatment | 0 | 1 | 2 | 3 | Average (g) |
| MIB Sulfate | — | 62.7 | 74.1 | 68.4 | 68.4 |
| MIB Oxisulfate | 63.8 | 73.7 | 69.4 | 60.7 | 67.9 |
| Formulation B | — | 81.5 | 71.6 | 77.8 | 77.0 |
| Average | 63.8 | 72.6 | 71.7 | 69.0 | |

Conclusions

The use of the slow-release soluble source technology, provided through the use of organominerals that allow physical-chemical interactions with the sources of micronutrients, favors the release of these nutrients in a gradual way, making it difficult to react with the soil to protect them.

At the dose of 1 kg ha$^{-1}$, Formulation B was the treatment that brought greater productivity gains, proving to be a viable alternative in the application of micronutrients in pre-planting, compared with a readily soluble source and another completely insoluble source.

Example IV

In this example, an exemplary formulation comprising about 75% to about 85% by weight of the first granules, about 12% to about 20% by weight of the second granules, and about 5% to about 8% by weight of the third granules described herein (Formulation C) was tested against a commercial MAP product control on both corn and soybean crops.

Test 1

This test evaluated the effect of contact time with soil after application of an embodiment of the present invention compared to a commercial monoammonium phosphate product in the dry phytomass production of corn plants grown in pots. A specific goal of the experiment was to determine whether the inventive fertilizer reduces the soil phosphorus adsorption process. Another goal was to determine whether the inventive formulation and the commercial product differ in nutrient supply efficiency when there is contact of the granule with the soil over time.

Material and Methods

Soil Collection, Chemical and Physical Soil Analysis

The soil collected in the depths of 20 to 60 cm located 5 km from BR-365 in the stretch between Patos de Minas and Patrocínio—km 418, with geographic coordinates (18° 43' 422' S and 46° 32' 606" W). After the collected soil was air-dried and sieved, soil physical analysis results were 651 g kg$^{-1}$ clay, 147 g kg$^{-1}$ silt, and 202 g kg$^{-1}$ sand. In the chemical analysis, the contents of exchangeable $Ca^{2+}$, $Mg^{2+}$, $K^+$ and $Al^{3+}$ were determined, as were the potential acidity by calcium acetate, total organic matter (MOS) by titolometry, P-assimilable by Mehlich-1, P-remaining by 0.01 mol L$^{-1}$ $CaCl_2$ containing 60 mg L$^{-1}$ of phosphorus and pH in water. For physical analysis of soil texture the Pipette method was used according to the methodology proposed by EMBRAPA (2009) (Table 16).

TABLE 16

Chemical characterization of soil.

| pH H$_2$O | M.O. dag dm$^{-3}$ | P | K | P-rem | Ca | Mg | (H + Al) | Al | T |
|---|---|---|---|---|---|---|---|---|---|
| | | mg dm$^{-3}$ | | | | | cmol$_c$ dm$^{-3}$ | | |
| 5.84 | 3.41 | 4.09 | 50.70 | 5.98 | 2.41 | 1.02 | 6.10 | 0.09 | 9.66 | pH in water, K, and P-assimilable by Mehlich-1, exchangeable Ca 2+, Mg 2+, and Al 3+ contents extracted by KCl; Total organic matter (MOS) by titulometry, according to Embrapa methodology (2009).

Experimental Design and Treatments

The experimental test used randomized blocks in factorial 3×9, with 4 replicates. The treatments consisted of three sources of phosphate fertilizers: conventional monoammonium phosphate and two sources with associated technology (coded by the company Produquimica SA) two sources of fertilizers: conventional monoammonium phosphate (MAP) and Formulation C. The 9 sample times were 150, 120, 90, 60, 30, 15 and 0 days after the incubation of 150 mg dm$^{-3}$ P$_2$O$_5$.

Implantation and Conduction of the Test

In the experimental trial, the soil samples were placed in pots of 5 dm$^{-3}$ making the applications of fertilizers in the determined times. The pots after fertilization were maintained at field capacity. The fertilizers were sieved in a 2.0 mm sieve for homogenization prior to application of the treatments, with application of 150 mg dm$^{-3}$ of P$_2$O$_5$ incorporated into the total volume of each pot. After the last fertilizer incubation time, 6 seeds per pot of a commercial corn hybrid were seeded. After the emergence of the seedlings, the thinning was carried out by conducting 4 plants per pot for 60 days.

Fertilizers for maize follow the recommendations proposed by CFSEMG (1999) applying all necessary nutrients minus phosphorus. In 4 fertilizations with a 5-day interval, the first one being performed at the time of sowing, doses of 150 mg·dm$^{-3}$ of N and 120 mg·dm$^{-3}$ of K$_2$O were administered using urea (45% N) and potassium (58% K$_2$O). A solution of micronutrients with Fe EDTA (16.04% Fe), H$_3$BO$_3$ (17.48% B), MnSO$_4$ (36.39% Mn), and 30 mL·dm$^{-3}$ were also applied at regular 5-day periods. ZnSO$_4$ (22.73% Zn), CuSO$_4$ (25.44% Cu) and (NH$_4$)$_6$Mo$_7$O$_2$ (54.34 mol %) at concentrations of 23.8, 1.3, 0.794, 0.106, 0.026, and 0.013 µg L$^{-1}$, respectively according to Johnson et al. (1957). During testing on the corn plants, vessels were weighed every day for the application of deionized H$_2$O and maintenance of field capacity.

Assessments

Approximately 60 days after the emergence of corn plants, the plant height in each pot was evaluated using a measuring tape graduated in centimeters. Then, the plants were sectioned 1 cm above the soil surface, obtaining aerial part and root. The chlorophyll content in the aerial part was estimated through the SPAD readings. The Chlorophyll Meter SPAD-502 (MINOLTA, 1989) was used, performing a reading per plant, setting the chlorophyllometer in the middle third of the leaf blade of the first fully expanded leaf. The aerial part, after the readings of the chlorophyll content, was dried in a forced air circulation oven at 65-72° C. until constant weight, and then weighed in order to obtain the aerial dry mass (MSPA).

After removal of the roots, the soil of each vessel was air-dried and samples were collected to determine the available P contents extracted by Mehlich-1 according to the methodology described by EMBRAPA (2009). MSPA samples were shredded in a Willis-type knife mill to quantify the phosphorus content in the plant tissue through the UV spectrophotometry with Vanadate Yellow methodology (EMBRAPA, 2009). The results obtained were submitted to analysis of variance and to their adjusted mean regression models for the incubation time and Tukey test for the sources within each incubation time, at 5% significance using the software Sisvar (FERREIRA, 2008).

Results

Dry Phytomass

Figure 5A:
FIG. 5A is a photograph showing the effect of aging on corn plants treated with control fertilizer.
Figure 5B:
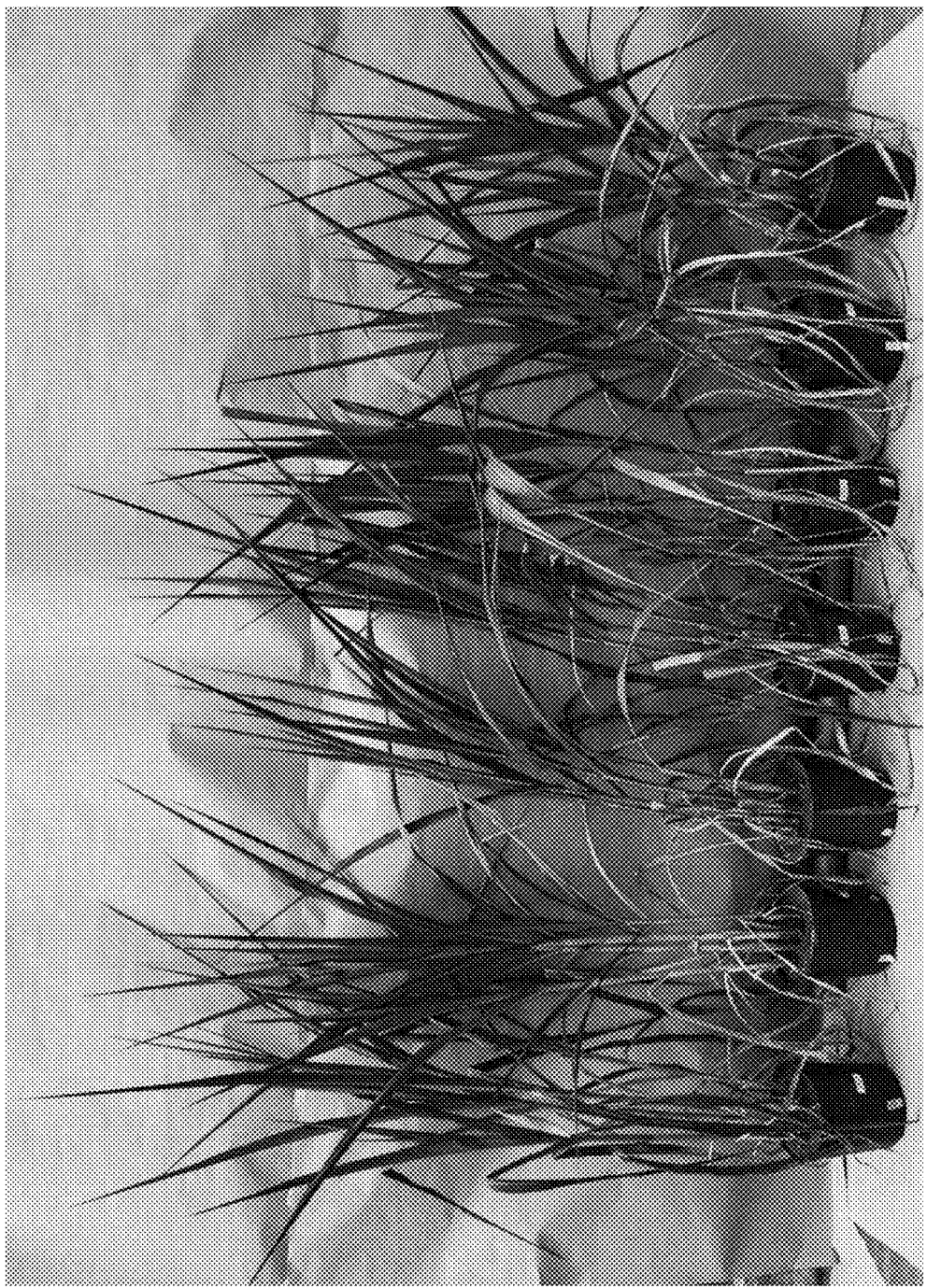
FIG. 5B is a photograph showing the effect of aging on corn plants treated with a fertilizer composition in accordance with an embodiment of the present invention.

Table 17, below, and FIGS. 5A and 5B show the results of the dry phytomass testing. FIG. 5A illustrates the effect of incubation time (aging) on application of 150 mg dm$^{-3}$ via the conventional MAP, while FIG. 5B illustrates the effect of incubation time (aging) on application of 150 mg dm$^{-3}$ via Formulation C.

TABLE 17

Dry matter accumulation of potted maize plants after periods of incubation of phosphorus in the soil.

| Aging | g pot$^{-1}$ | |
| --- | --- | --- |
| days | Formulation C | MAP |
| 150 | 22.73Da$^{\backslash 1}$ | 22.23 Ea |
| 120 | 23.98 Da | 26.23 Ea |
| 90 | 53.63 Ca | 32.11Db |
| 60 | 64.74 Ba | 41.57Cb |
| 30 | 68.87ABa | 51.37Bb |
| 15 | 69.12ABa | 65.61Aa |
| 0 | 70.11 Aa | 69.33Aa |
| CV% = 7.58 | | |

$^{\backslash 1}$The averages followed by different lowercase letters in the row and distinct capital letters in the column differ by the Tukey test at 0.05 significance.

SPAD Index

Table 18, below, shows the results of the SPAD Index testing.

TABLE 18

Mean values of SPAD index of maize plants grown in pot after periods of incubation of phosphorus in the soil.

| Aging | SPAD | |
| --- | --- | --- |
| days | Formulation C | MAP |
| 150 | 23.80a$^{\backslash 1}$ | 20.52a |
| 120 | 24.75a | 20.07a |
| 90 | 28.00a | 25.61a |
| 60 | 35.80b | 31.84b |
| 30 | 44.75ab | 39.86b |
| 15 | 49.10a | 42.33b |
| 0 | 52.61a | 48.42a |
| CV% = 7.62 | | |

$^{\backslash 1}$The averages followed by distinct letters in the line differ by the Tukey test at 0.05 of significance.

Stem Diameter

Table 19, below, shows the results of stem diameter testing.

TABLE 19

Mean values of stem diameter (mm) in potted maize plants after periods of incubation of phosphorus in the soil.

| Aging | Stem Diameter (mm) | |
| --- | --- | --- |
| days | Formulation C | MAP |
| 150 | 9.80 | 8.78 |
| 120 | 9.75 | 8.95 |
| 90 | 10.25 | 9.38 |
| 60 | 10.55 | 9.85 |
| 30 | 10.31 | 10.50 |
| 15 | 11.85 | 11.87 |
| 0 | 11.97 | 11.82 |
| Average | 10.64a$^{\backslash 1}$ | 10.16b |
| CV% = 4.76 | | |

$^{\backslash 1}$The averages followed by distinct letters in the line differ by the Tukey test at 0.05 of significance.

Phosphorus Leaf Content

Table 20, below, shows the results of the phosphorus leaf content testing.

TABLE 20

Mean values of P foliar contents in potted corn plants after periods of incubation of phosphorus in the soil.

| Aging | Leaf Content of P (g kg$^{-1}$) | |
| --- | --- | --- |
| days | Formulation C | MAP |
| 150 | 1.15 | 1.07 |
| 120 | 1.50 | 1.22 |
| 90 | 2.15 | 1.52 |
| 60 | 3.19 | 2.23 |
| 30 | 2.76 | 2.52 |
| 15 | 2.69 | 2.88 |
| 0 | 2.66 | 2.58 |
| Average | 2.30a | 2.00b |
| CV% = 17.19 | | |

\1 The averages followed by distinct letters in the line differ by the Tukey test at 0.05 of significance.

Phosphorus Extraction by Aerial Part of Plants (Dry Phytomass)

In Table 21, below, the values correspond to the amount of phosphorus extracted per vessel as a function of the dry matter production of the area and its phosphorus content.

$$\text{Content of } P \text{ extracted (mg pot}^{-1}) = \frac{\text{Leaf Content of } P(\text{g kg}^{-1}) * FTMS(\text{g pot}^{-1})}{1000}$$

In which:

Content of extracted P=P accumulated in the vegetal tissue of aerial part

Leaf content of P=leaf content of P in the aerial part of maize plants

FTMS=Dry shoot biomass of corn plants

TABLE 21

Mean values for phosphorus extraction values by potted maize plants after periods of phosphorus incubation in soil.

| Aging | Content of P (mg pot$^{-1}$) | |
| --- | --- | --- |
| days | Formulation C | MAP |
| 150 | 26.05a\1 | 23.70a |
| 120 | 35.85a | 31.38a |
| 90 | 128.97a | 49.11b |
| 60 | 206.63a | 92.20b |
| 30 | 189.93a | 129.74b |
| 15 | 185.83a | 188.39a |
| 0 | 204.31a | 178.83a |
| Average | 139.65 | 99.05 |
| CV% = 17.15 | | |

\1 The averages followed by distinct letters in the line differ by the Tukey test at 0.05 of significance.

Conclusions

The results show the "protective" effect of the technology applied to Formulation C, attenuating reactions of phosphorus unavailability in the soil caused by the contact time of the fertilizer. These effects were evidenced mainly in the production of dry shoot biomass (FTMS) of maize plants cultivated in the pots submitted to the aging of the fertilizer. While the effects of the contact time of the fertilizer with the soil in the treatments with conventional MAP application were observed from the 30 days of incubation, in the treatments with application of Formulation C the lower production of FTMS in relation to time zero occurred from the 90 days of incubation (Table 17). The increase in FTMS production in treatments with Formulation C application compared to conventional MAP was around 35% at 30 days, 55% at 60 days, and greater than 65% at 90 days of incubation. FTMS results can be explained by the higher extraction of P by plants in the treatments with Formulation C when the incubation time was 30, 60 and 90 days (Table 21). At intervals from zero to 15 days and at 120 and 150 days of incubation, no differences were observed between treatments.

Test 2

Figure 6A:
FIG. 6A is a photograph showing the root system of a soybean plant grown in soil treated with control fertilizer.
Figure 6B:
FIG. 6B is a photograph showing the root system of a soybean plant grown in soil treated with a fertilizer composition in accordance with an embodiment of the present invention.
Figure 7B:
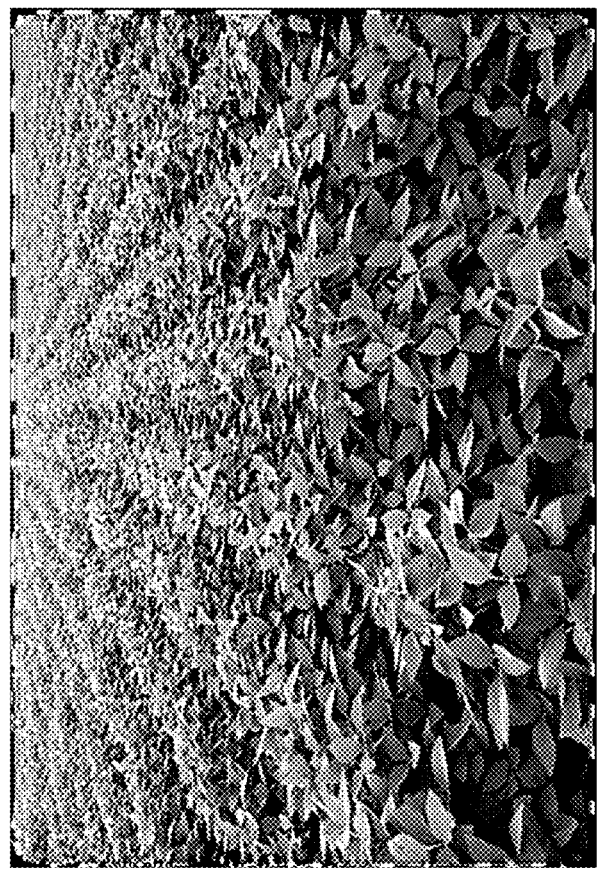
FIG. 7B is a photograph showing foliar coverage between rows of soybean plants grown in soil treated with a fertilizer composition in accordance with an embodiment of the present invention.
Figure 7A:
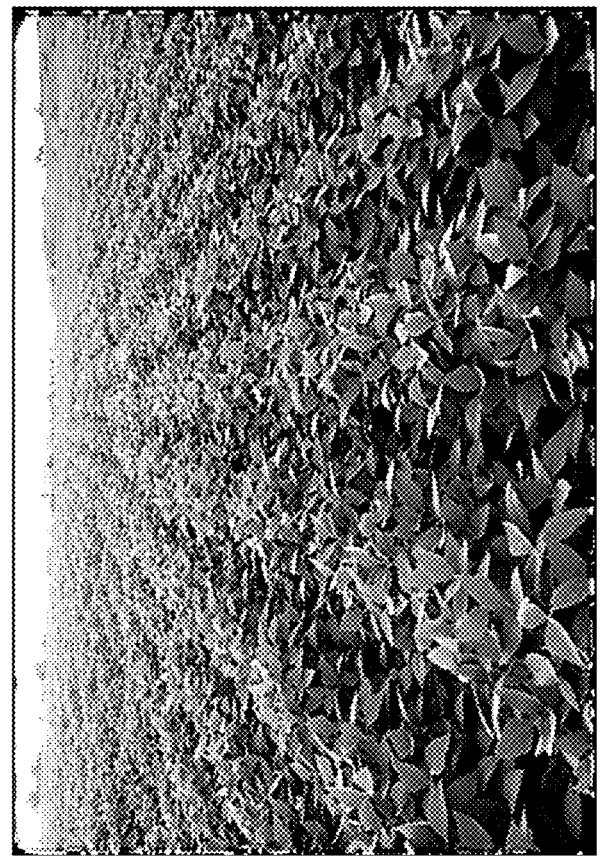
FIG. 7A is a photograph showing foliar coverage between rows of soybean plants grown in soil treated with control fertilizer.
Figure 8B:
FIG. 8B is a photograph showing exemplary samples of soybean plants grown in soil treated with a fertilizer composition in accordance with an embodiment of the present invention.
Figure 8A:
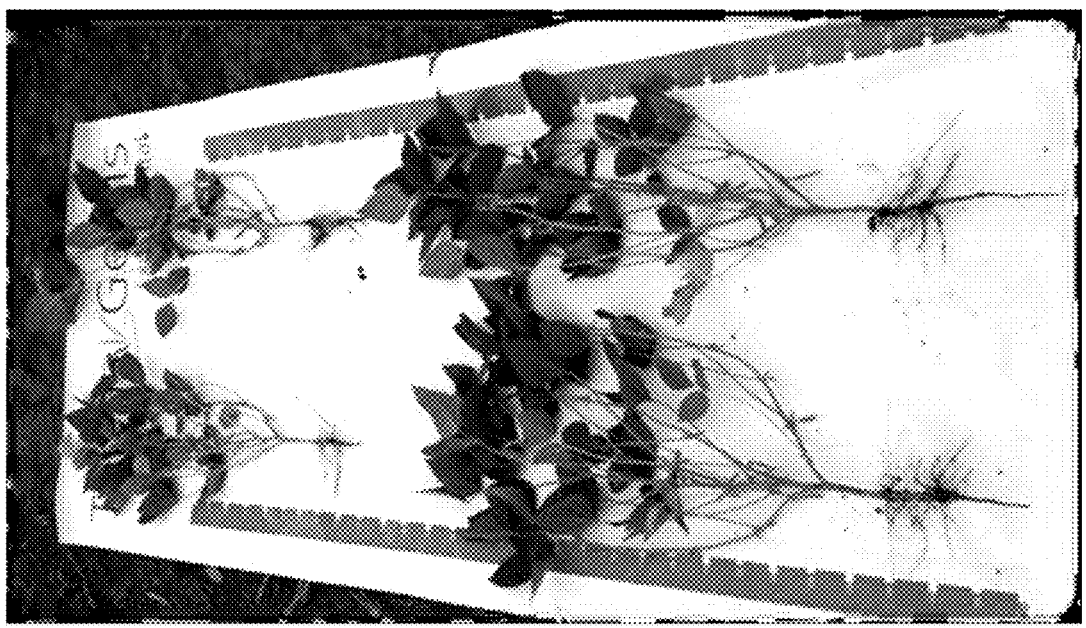
FIG. 8A is a photograph showing exemplary samples of soybean plants grown in soil treated with control fertilizer.
Figure 9B:
FIG. 9B is a photograph showing pod formation of a soybean plant grown in soil treated with a fertilizer composition in accordance with an embodiment of the present invention.
Figure 9A:
FIG. 9A is a photograph showing pod formation of a soybean plant grown in soil treated with control fertilizer.

Similar testing was performed on soybean crops in the field. The fertilizer formulations were each applied to the soybean crops at a rate of 200 kg·ha$^{-1}$. As shown in FIGS. 6A and 6B, Formulation C resulted in greater nodulation and better development of the root system. As shown in FIGS. 7A and 7B, Formulation C resulted in greater foliar closure between rows, indicating greater productive potential. As shown in FIGS. 8A, 8B, 9A, and 9B, Formulation C resulted in better plant architecture, a greater number of branches per plant, a greater number of leaves, and greater uniformity in pod formation. Additional results are summarized in Table 22, below.

TABLE 22

Productivity results.

| | MAP (Control) | Formulation C |
| --- | --- | --- |
| Sample area | 2.0 ha | 2.0 ha |
| Net weight of application | 8125.2 kg | 8629.2 kg |
| Humidity | 17.15% | 16.95% |
| Production | 67.71 bags/ha | 71.91 bags/ha |
| Average pods per plant | 63.5 | 70.5 |

The invention claimed is:

1. A granular fertilizer composition comprising:
   first granules comprising a source of phosphorus substantially encapsulated by a coating;
   second granules comprising a hydrated aluminosilicate having a plurality of pores formed therein and comprising a source of boron, a source of copper, a source of manganese, and a source of zinc, each of said source of boron, said source of copper, said source of manganese, and said source of zinc being affixed to an inner surface of one or more of said plurality of pores; and
   third granules comprising a source of sulfur.

2. The fertilizer composition of claim 1, wherein said coating comprises a polymer.

3. The fertilizer composition of claim 2, wherein said polymer is an anionic polymer.

4. The fertilizer composition of claim 1, wherein said coating comprises humic acid.

5. The fertilizer composition of claim 1, wherein said coating comprises fulvic acid.

6. The fertilizer composition of claim 1, wherein said coating comprises titanium dioxide.

7. The fertilizer composition of claim 1, said coating comprising humic acid, fulvic acid, and a polymer.

8. The fertilizer composition of claim 7, wherein said coating comprises titanium dioxide.

9. The fertilizer composition of claim 7, wherein said source of phosphorus comprises a compound selected from the group consisting of monoammonium phosphate, diammonium phosphate, monopotassium phosphate, tripotassium phosphate, single superphosphate, double superphosphate, triple superphosphate, calcined phosphate, urea-phosphate, and mixtures thereof.

10. The fertilizer composition of claim 1, wherein said hydrated aluminosilicate is clinoptilolite.

11. The fertilizer composition of claim 1, wherein said plurality of pores have an average diameter less than about 2 nm.

12. The fertilizer composition of claim 1, wherein said source of phosphorus comprises monoammonium phosphate.

13. The fertilizer composition of claim 1, wherein each of said first granules comprises from about 93% to about 99% by weight of said source of phosphorus with the total weight of said first granule taken as 100% by weight.

14. The fertilizer composition of claim 1, wherein said source of boron comprises sodium octaborate.

15. The fertilizer composition of claim 1, wherein said source of copper comprises copper sulfate.

16. The fertilizer composition of claim 1, wherein said source of manganese comprises manganese sulfate.

17. The fertilizer composition of claim 1, wherein said source of zinc comprises zinc sulfate.

18. The fertilizer composition of claim 1, wherein said third granules comprise bentonite clay.

19. The fertilizer composition of claim 1, wherein said source of sulfur is insoluble in water.

20. The fertilizer composition of claim 1, wherein said first, second, and third granules have a substantially uniform average diameter.

21. The fertilizer composition of claim 1, said composition comprising from about 50% to about 95% by weight of said first granules.

22. The fertilizer composition of claim 1, said composition comprising from about 3% to about 20% by weight of said second granules.

23. The fertilizer composition of claim 1, said composition comprising from about 5% to about 30% by weight of said third granules.

24. A method of fertilizing a crop comprising applying the fertilizer composition of claim 1 to soil.

25. The method of claim 24, wherein said fertilizer composition is applied at a rate of about 50 kg·ha$^{-1}$ to about 500 kg·ha$^{-1}$.

* * * * *